US012789553B2

(12) United States Patent
Albl et al.

(10) Patent No.: US 12,789,553 B2
(45) Date of Patent: Nov. 10, 2026

(54) WHEEL CARRIER ARRANGEMENT FOR A MOTOR VEHICLE AND METHOD FOR PRODUCING SUCH A WHEEL CARRIER ARRANGEMENT

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/985,434

(22) Filed: Dec. 18, 2024

(65) Prior Publication Data

US 2025/0282174 A1 Sep. 11, 2025

(30) Foreign Application Priority Data

Mar. 5, 2024 (DE) ......................... 102024106309.2

(51) Int. Cl.
*B60B 27/00* (2006.01)
*B60B 27/04* (2006.01)
*F16C 33/78* (2006.01)
*F16C 33/80* (2006.01)
*F16C 41/00* (2006.01)

(52) U.S. Cl.
CPC ...... *B60B 27/0047* (2013.01); *B60B 27/0073* (2013.01)

(58) Field of Classification Search
CPC .............. B60B 27/0005; B60B 27/001; B60B 27/0047; B60B 27/0073; B60B 27/0078; B60B 27/0094
USPC .......................................................... 280/143
See application file for complete search history.

(56) References Cited

U.S. PATENT DOCUMENTS 3,510,138 A 5/1970 Bowen et al.
8,087,831 B2 1/2012 Sakamoto et al.
2024/0383276 A1 * 11/2024 Schaaf ................ B60B 27/0073

FOREIGN PATENT DOCUMENTS

CN 120588670 A * 9/2025 ......... B60B 27/0073
CN 120958253 A * 11/2025 ......... B60B 27/0084
DE 102006032159 A1 1/2008
DE 102007010290 A1 * 9/2008 ......... B60B 27/0073
DE 102007040581 A1 * 3/2009 ............ F16C 35/073

(Continued)

OTHER PUBLICATIONS

Description Translation for DE 102022104768 from Espacenet (Year: 2023).*

(Continued)

*Primary Examiner* — Daniel M. Keck
(74) *Attorney, Agent, or Firm* — Maier & Maier, PLLC

(57) ABSTRACT

A wheel carrier arrangement for a motor vehicle, with a wheel carrier and a wheel bearing for the rotary mounting of a wheel hub on the wheel carrier about a wheel hub axis of rotation. The wheel hub has a first gear which engages with a second gear of a torque transmission element. A sealing which interacts sealingly with a pre-sealing element is arranged between an inner ring and an outer ring of the wheel bearing and the pre-sealing element interacts in a form-fitting manner with the torque transmission element in order to fix it in the axial direction with respect to the wheel hub axis of rotation relative to the wheel bearing. The pre-sealing element surrounds the outer ring of the wheel bearing to form a sealing labyrinth.

19 Claims, 2 Drawing Sheets

(56) References Cited

FOREIGN PATENT DOCUMENTS

| | | | | | |
|---|---|---|---|---|---|
| DE | 102016222110 | A1 * | 3/2017 | .......... F16C 33/7879 |
| DE | 102022104768 | A1 | 9/2023 | |
| DE | 102016222855 | B4 * | 7/2025 | ......... B60B 27/0005 |
| DE | 102025120858 | A1 * | 7/2025 | ......... B60B 27/0068 |
| DE | 102025120856 | A1 * | 8/2025 | ............. F16J 15/122 |
| DE | 102024115606 | A1 * | 12/2025 | |
| EP | 2541108 | B1 | 3/2015 | |
| EP | 3740706 | B1 * | 5/2024 | ........... F16J 15/3264 |
| JP | H0317324 | B2 * | 3/1991 | |
| JP | 2002195280 | A | 7/2002 | |
| JP | 2008221864 | A | 9/2008 | |
| JP | 2008223783 | A | 9/2008 | |
| JP | 2009197941 | A | 9/2009 | |
| JP | 2009543009 | A | 12/2009 | |
| WO | 2009140996 | A1 | 11/2009 | |
| WO | WO-2025185888 | A1 * | 9/2025 | ............ F16C 33/783 |

OTHER PUBLICATIONS

Extended Search Report issued on May 16, 2025, in corresponding European Application No. 24216148.7, 20 pages.

Search Report issued on Oct. 30, 2024, in corresponding German Application No. 102024106309.2, 6 pages.

Office Action issued on Mar. 17, 2026, in corresponding Japanese Application No. 2025-017211, 8 pages.

* cited by examiner

WHEEL CARRIER ARRANGEMENT FOR A MOTOR VEHICLE AND METHOD FOR PRODUCING SUCH A WHEEL CARRIER ARRANGEMENT

FIELD

The invention relates to a wheel carrier arrangement for a motor vehicle, with a wheel carrier and a wheel bearing for the rotary mounting of a wheel hub on the wheel carrier about a wheel hub axis of rotation, wherein the wheel hub has a first gear which engages with a second gear of a torque transmission element, wherein a sealing which interacts sealingly with a pre-sealing element is arranged between an inner ring and an outer ring of the wheel bearing and the pre-sealing element interacts in a form-fitting manner with the torque transmission element in order to fix it in the axial direction with respect to the wheel hub axis of rotation relative to the wheel bearing. The invention further relates to a method for producing a wheel carrier arrangement for a motor vehicle.

BACKGROUND

DE 10 2022 104 768 A1 is known from the prior art, for example. It describes a wheel bearing sealing for a spur gear, comprising a sealing carrier and a sealing element carried by the sealing carrier, wherein the wheel bearing sealings have an encoder for sensory detection of a rotational speed and a snap-in element formed on the sealing carrier, which axially fixes the wheel bearing seals in a form-fitting manner relative to the spur gear of a wheel bearing unit.

Furthermore, DE 10 2006 032 159 A1 describes a bearing arrangement of a wheel hub of a motor vehicle that can be driven via a rotary joint, in which the wheel hub connected to a wheel flange and the rotary joint connected to a drive shaft are connected to one another in a rotationally fixed manner by means of a gear, and with a double-row rolling bearing inserted on the wheel hub with at least one separate, axially externally arranged inner bearing ring directed towards the rotary joint, which ring is arranged with an axially outer end face in the region of one end of an axle stub of the wheel hub and which is axially preloaded by a radial surface of the wheel hub acting on the end face of the separate inner bearing ring, wherein the outer ring and inner bearing ring are provided with a sealing which has at least one sealing ring connected to the inner bearing ring and made of sheet metal, which sealing ring has a radial leg and an axial leg in cross section, wherein the axial leg is connected to the inner bearing ring in a rotationally fixed manner and is directed axially inwards. It is provided that the axial leg of the sealing ring of the bearing inner ring is bent radially inward and axially outward, with a free end of the axial leg projecting axially outward beyond the end face of the bearing inner ring.

Further wheel bearing arrangements are known from EP 2 541 108 B1 and WO 2009/140996 A1.

SUMMARY

It is an object of the invention to propose a wheel carrier arrangement for a motor vehicle which has advantages over known wheel carrier arrangements, in particular has a high degree of tightness while being easy to assemble and is therefore particularly resistant to influences from the external environment of the motor vehicle.

This is achieved according to the invention with a wheel carrier arrangement for a motor vehicle. It is intended that the pre-sealing element surrounds the outer ring of the wheel bearing to form a sealing labyrinth.

It is pointed out that the embodiments explained in the description are not restrictive; rather, any variations of the features disclosed in the description, the claims and the figures can be implemented.

The wheel carrier arrangement serves to connect a wheel to a body of the motor vehicle. The arrangement is preferably part of the motor vehicle, but can of course also be present separately from it, in particular before the wheel carrier arrangement is fitted to the motor vehicle. Particularly preferably, the wheel carrier arrangement is part of a wheel suspension, by means of which the wheel carrier and thus also the wheel are suspended with respect to the body, in particular suspended in a spring-like manner. The wheel is rotatably mounted on the wheel carrier of the wheel suspension. For this purpose, the wheel is attached or can be attached to the wheel hub, which is finally rotatably mounted on the wheel carrier by means of the wheel bearing after the wheel suspension has been mounted, in particular on the motor vehicle. The wheel or at least one rim of the wheel is rotatably mounted on the wheel carrier via the wheel hub. The rim serves as a carrier for a tire of the wheel, preferably a pneumatic tire.

The wheel carrier has, for example, a wheel bearing receptacle which is designed as an opening, in particular as an edge-closed opening, in the wheel carrier. The wheel bearing is located in the wheel bearing receptacle. In addition, the wheel hub and/or a shaft coupled to it in a rotationally fixed manner engages at least partially in the wheel bearing receptacle. Particularly preferably, the wheel hub and/or the shaft penetrate, in particular together, the wheel bearing receptacle in the axial direction with respect to the wheel hub axis of rotation at least partially, in particular completely.

The wheel bearing is preferably designed as a rolling bearing and therefore has an inner ring and an outer ring, between which rolling elements are present to reduce friction. The inner ring is assigned to the wheel hub, in particular connected to the wheel hub, for example it is designed as a single piece with it or fastened thereto, whereas the outer ring is assigned to the wheel carrier, in particular connected to the wheel carrier, for example fastened thereto. The outer ring is preferably located in the wheel bearing receptacle. In other words, the outer ring rests with its outer peripheral surface on an inner peripheral surface of the wheel carrier that delimits the wheel bearing receptacle.

In addition to the wheel carrier arrangement, the wheel suspension has a control arm arrangement which serves to couple the wheel carrier to the body of the motor vehicle. The control arm arrangement is therefore connected on the one hand to the wheel carrier and on the other hand to the body. Preferably, the control arm arrangement engages directly on the wheel carrier or is directly mounted thereon, in particular rotatably mounted. The connection of the control arm arrangement to the wheel carrier is made, for example, by means of a control arm bearing, which is arranged between the control arm arrangement and the wheel carrier. The control arm arrangement may comprise a wishbone and/or a trapezoidal control arm and/or one or more rod control arms. Each of these control arms engages the wheel carrier on the one hand and the body on the other, either directly or at least indirectly. Each of the control arms can be designed either as a wishbone or as a trailing arm.

Furthermore, the wheel suspension has a suspension strut, for example, to dampen and cushion the wheel carrier in relation to the body. The control arm arrangement is therefore connected on the one hand to the wheel carrier and on the other hand to the body. The suspension strut has at least one damper to dampen the wheel carrier in relation to the body by at least one spring to provide suspension in relation to the body. In principle, the damper and the spring can be arranged in any way, for example connected in series or in parallel. The suspension strut is particularly preferably a MacPherson strut. In this case, the suspension strut not only serves to provide suspension or dampen the wheel or wheel carrier, but also to guide the wheel.

The wheel carrier is at least temporarily coupled to a drive device of the motor vehicle. The drive device can be designed as an individual wheel drive. Preferably, it has an electric traction machine by means of which a drive torque aimed at driving the motor vehicle can be generated or is at least temporarily generated. The drive connection of the wheel hub to the drive device is made via the torque transmission element. The wheel hub is non-rotatably coupled to the torque transmission element. For this purpose, the wheel hub has the first gear, which engages with the second gear of the torque transmission element. The gears are available, for example, as axial gears or, preferably, as spur gears. The spur gears are preferably designed as Hirth gears. For example, the torque transmission element is part of an angularly movable joint, via which the wheel carrier is coupled to a shaft or a drive shaft.

In order to protect the wheel bearing from influences from the external environment of the vehicle, a sealing is arranged between the inner ring and the outer ring of the wheel bearing. This is designed to seal an interior of the wheel bearing, in particular a rolling element space of the wheel bearing that accommodates the rolling elements, from the outside environment, namely from the direction of the torque transmission element. To improve the effect of the seal, the wheel carrier arrangement has the pre-sealing element. This is non-rotatably connected to the inner ring, whereas the sealing is non-rotatably connected to the outer ring. In this respect, the sealing lies directly on the outer ring on the one hand and also interacts with the pre-sealing element to form a sealing on the other hand, for example it rests against it or is arranged adjacent to it.

The sealing interaction does not mean that the sealing only achieves a sealing effect together with the pre-sealing element; rather, the sealing and the pre-sealing element can each achieve a sealing effect separately, so that the interaction of the sealing and the pre-sealing element achieves a particularly good overall sealing effect. Preferably, the sealing has multiple sealing lips, of which preferably one extends inwards in the radial direction and another in the axial direction in the direction of the torque transmission element and/or in the direction of the pre-sealing element, for example sealingly abuts the pre-sealing element.

Such a wheel carrier arrangement is complex to assemble due to the engaged gears, especially in the case of spur gears, since it must be ensured that the teeth of one of the gears engage in the tooth gaps of the other gears and vice versa, i.e. that the teeth of the gears do not abut each other. For this reason, the pre-sealing element should be designed as an assembly aid, namely by interacting in a form-fitting manner with the torque transmission element in order to set it in the axial direction relative to the wheel bearing and/or the wheel hub. The setting takes place in an axial position of the torque transmission element and the wheel hub or wheel bearing in relation to one another, in which the teeth of the first gear engage in the tooth gaps of the second gear and vice versa, in which the gears are therefore completely in engagement with one another.

When assembling the wheel carrier arrangement, the torque transmission element and the wheel hub are moved towards each other until the gears engage with each other. In the position in which this occurs, the pre-sealing element comes into form-fitting engagement with the torque transmission element in order to fix the torque transmission element and the wheel bearing and/or the wheel hub together so that the gears can no longer disengage.

The torque transmission element is then completely connected to the wheel hub, for example by screwing a clamping screw that passes through the wheel hub into the torque transmission element. A head of the clamping screw rests on the side of the wheel hub facing away from the torque transmission element, so that the wheel hub and the torque transmission element are pushed towards each other in the axial direction and clamped together by means of the clamping screw. The form-fitting interaction of the pre-sealing element with the torque transmission element also has the advantage that the gears are also sealed against the outside environment, so that no further sealing measures are necessary for this purpose.

However, even with such a design of the wheel carrier arrangement, moisture from the outside environment can still penetrate into it, in particular up to the sealing and via this into the wheel bearing. For this reason, the sealing should be further improved. It is intended that the pre-sealing element surrounds the outer ring of the wheel bearing to form a sealing labyrinth. What this ultimately means is that the pre-sealing element is present both on the inside and outside of the outer ring in the radial direction. In particular, the pre-sealing element engages between the inner ring and the outer ring of the wheel bearing, thus overlapping them in the axial direction.

In addition, the pre-sealing element also encompasses the outer ring, i.e. it is also located on the side of the outer ring facing away from the inner ring in the radial direction, in particular it engages there between the outer ring and the wheel carrier. The pre-sealing element surrounds the outer ring in such a way that the sealing labyrinth is created, so that at least the pre-sealing element and the outer ring together form a labyrinth seal. Preferably, the wheel carrier also contributes to the formation of the labyrinth seal, in particular by the pre-sealing element engaging between the outer ring and the wheel carrier. This ensures particularly reliable sealing of the wheel carrier arrangement against the outside environment.

A further development of the invention provides that the torque transmission element is a joint element of an angularly movable joint, via which the wheel carrier is drivingly coupled to a shaft. For this purpose, the angularly movable joint is connected to the shaft on the one hand and to the wheel hub on the other hand. The angularly movable joint is preferably a constant velocity joint. However, other designs, such as a universal joint or the like, are also conceivable in principle. The angularly movable joint has a plurality of joint elements, namely at least a first joint element and a second joint element, which are connected to one another in an angularly movable manner.

This means that the two joint elements, i.e. the first joint element and the second joint element, are connected to each other in a torque-transmitting manner, but their position relative to each other can change. Thus, the first joint element is mounted so as to be rotatable about a first axis of rotation and the second joint element is mounted so as to be rotatable about a second axis of rotation. The axes of rotation usually intersect each other, but can form any angle within a drive shaft angle range during normal operation of the wheel carrier arrangement. This angle can vary during operation of the wheel carrier arrangement; in the context of the wheel suspension, for example, this compensates for any compression of the wheel carrier.

The first joint element is coupled to the shaft in a rotationally fixed manner, the second joint element is preferably coupled to the wheel hub or at least can be coupled thereto. For this purpose, the second joint element has the second gear, which is or is brought in a torque-transmitting connection with the first gear of the wheel hub. The use of the angularly movable joint enables a reliable drive connection of the wheel hub to the drive device.

A further development of the invention provides that the pre-sealing element has a first sealing part and a second sealing part, wherein the first sealing part rests on the inner ring of the wheel bearing and extends to the side of the outer ring facing away from the inner ring and the second sealing part extends from the first sealing part and interacts with the torque transmission element in a form-fitting manner. The first sealing part thus originates from the inner ring of the wheel bearing and extends radially outwards, namely up to the side of the outer ring facing away from the inner ring. There, together with the outer ring, it forms the sealing labyrinth and, accordingly, the labyrinth seal.

For example, the first sealing part is designed to be essentially C-shaped, i.e. it has a first leg which rests on the inner ring, a second leg which originates from the first leg and extends outwards in the radial direction, and a third leg which originates from the second leg and is arranged on the side of the outer ring facing away from the inner ring. The first leg and the third leg are each angled relative to the second leg, thus forming an angle with it that is greater than 0° and less than 180°. Preferably, the angle is at least 60° and at most 120°, at least 75° and at most 105° or approximately or exactly 90°.

Preferably, a length of the third leg in the axial direction starting from the second leg is at least 50%, at least 75% or at least 100% of a length of the first leg in the axial direction, also measured from the second leg. The first leg and the third leg together encompass the outer ring, the first leg being on the side of the outer ring facing the inner ring and the third leg being on the side of the outer ring facing away from the inner ring. The first leg and the third leg are spaced apart from the second leg, in particular are connected to each other only via the latter.

The second sealing part originates from the first sealing part and is therefore directly connected to it. It extends from the first sealing part in the axial direction, in particular up to the torque transmission element and engages it in a form-fitting manner. In this respect, the second sealing part is designed in the manner of a cantilever. For example, the second sealing part has dimensions in the axial direction which at least correspond to the dimensions of the first sealing part in the same direction, but are preferably larger, for example by a factor of at least 1.5, at least 2.0 or at least 2.5. The described design of the wheel carrier arrangement enables both simple assembly and reliable sealing against the external environment.

A further development of the invention provides that the first sealing part consists of a first material and the second sealing part consists of a second material, wherein the first material and the second material are identical or different from one another. In the first variant, the two sealing parts are made of different materials, for example metal is used for the first material and plastic is used for the second material. In particular, in this case the second sealing part is molded onto the first sealing part. However, it can also be provided that the two sealing parts are made of the same material. In this case too, they can be molded together, but they are particularly preferred to be designed as a single piece and made from the same material. In any case, the advantages already mentioned are achieved with such a design of the wheel carrier arrangement.

A further development of the invention provides that the first sealing part is materially connected to the second sealing part, or that the first sealing part and the second sealing part are designed in one piece and from the same material. Such a design has already been mentioned. The material connection between the two sealing parts is particularly provided if different materials are used for the sealing parts. Otherwise, they are preferably manufactured in one piece and from the same material, in particular they are available combined together as a stamped and bent part. This enables simple and cost-effective production of the wheel carrier arrangement.

A further development of the invention provides that the second sealing part is elastic, so that an end of the second sealing part facing the torque transmission element can be elastically deflected relative to the first sealing part. The second sealing part is designed such that it is elastically deformed from an initial shape during assembly of the wheel carrier arrangement, in particular when the torque transmission element and the wheel hub or wheel bearing are moved towards one another. Due to this deformation, a restoring force is created which pushes the second sealing part back into its original shape.

Due to the restoring force, when the torque transmission element and wheel hub reach an assembly position in which the gears are fully engaged with each other, the pre-sealing element comes into form-fitting engagement with the torque transmission element, so that the torque transmission element is fixed in the axial direction with respect to the wheel hub. In particular, during assembly, the second sealing part is pushed outwards in a radial direction starting from the initial position, so that its end facing away from the wheel bearing is pushed by the restoring force in the direction of the torque transmission element. This ensures simple and reliable installation of the wheel carrier arrangement.

A further development of the invention provides that between the outer ring and the wheel carrier there is a labyrinth gap for receiving the pre-sealing element, which is in particular produced at least partially, preferably completely, in the outer ring and/or at least partially, preferably completely, in the wheel carrier. The labyrinth gap is delimited in the radial direction on the inside by the outer ring and in the radial direction on the outside by the wheel carrier. The labyrinth gap is provided and designed to accommodate the pre-sealing element and the pre-sealing element is present in it after assembly of the wheel carrier arrangement.

The labyrinth gap can be formed in the outer ring and/or in the wheel carrier. For example, there is a recess in the outer ring on its side facing the wheel carrier, which forms the labyrinth gap. Such a design enables, on the one hand, a reliable production of the labyrinth sealing by the engagement of the pre-sealing element in the labyrinth gap and, on the other hand, the arrangement of an encoder or pulse generator is made possible. The pulse generator has, for example, an element attached to the pre-sealing element, in particular a rubber element. Preferably, the pulse generator is vulcanized onto the pre-sealing element. The described design ensures good sealing.

A further development of the invention provides that the pre-sealing element has a sealing projection which engages in the labyrinth gap over a distance which corresponds to at least one gap width in the radial direction. The gap width corresponds to a distance between the outer ring and the wheel carrier in the labyrinth gap. The sealing projection of the pre-sealing element, which corresponds in particular to the above-mentioned third leg of the pre-sealing element, engages in the labyrinth gap in the axial direction over the specific distance. This distance corresponds at least to the gap width, but is preferably larger, for example by a factor of at least 1.5, at least 2.0 or at least 2.5. This ensures a good sealing effect of the labyrinth seal.

A further development of the invention provides that the sealing projection in the labyrinth gap has a first distance from the outer ring and a second distance from the wheel carrier, wherein the first distance and the second distance are each at least 0.1 mm to at most 5 mm. The distances are to be understood as radial distances. The sealing projection thus engages between the outer ring and the wheel carrier, but does not touch them. Preferably, the distance is as small as possible, but larger distances may also be permitted; in particular, in this case, however, the sealing projection should engage in the labyrinth gap by the distance defined above in order to achieve a sufficient sealing effect.

A further development of the invention provides that the wheel carrier has a recess in which the wheel bearing, the wheel hub and the torque transmission element are each arranged at least in some regions and the inner dimensions of the recess decrease in the radial direction with respect to the wheel hub axis of rotation, from the wheel bearing towards the torque transmission element. The recess preferably also forms the already mentioned wheel bearing receptacle in which the wheel bearing is arranged. Viewed in longitudinal section with respect to the wheel hub axis of rotation, the recess accommodates the wheel bearing, the wheel axle and the torque transmission element, each at least in regions.

The outer ring of the wheel bearing rests with its outer peripheral surface on an inner peripheral surface of the wheel carrier that delimits the recess. Preferably, the recess has constant dimensions in the radial direction in a region in the axial direction in which the wheel bearing overlaps the wheel carrier. However, away from the wheel bearing, the dimensions of the recess decrease. Preferably, minimal dimensions of the recess are present, in the radial direction, in a longitudinal section, away from the pre-sealing element or at most in overlap with the end of the second sealing part. It is particularly preferred that the minimum internal dimensions of the recess are smaller than the dimensions of the pre-sealing element, in particular of the first sealing part, in the radial direction. This ensures that the torque transmission element is guided during assembly of the wheel carrier arrangement and damage to the pre-sealing element is reliably avoided.

A further development of the invention provides that, for form-fitting engagement of the pre-sealing element with the torque transmission element, the torque transmission element has a sealing gap into which the pre-sealing element engages in a sealing manner. The sealing gap is preferably designed to be continuous in the circumferential direction in the torque transmission element, i.e. it is present as a groove or circumferential groove. The pre-sealing element engages in the sealing gap. For example, it lies sealingly against a bottom delimiting the sealing gap and/or against a wall delimiting the sealing gap, or it engages in the sealing gap without contact to create another labyrinth seal.

The form-fitting interaction of the pre-sealing element with the torque transmission element by engaging in the sealing gap thus causes, on the one hand, the fixing of the torque transmission element with respect to the wheel bearing and/or the wheel hub in the axial direction and, on the other hand, a sealing of the gears against the external environment. Preferably, the pre-sealing element engages continuously in the groove in the circumferential direction in order to achieve a good sealing effect.

A further development of the invention provides that in a region in the axial direction, within which the pre-sealing element overlaps the torque transmission element, there is a radial gap between the pre-sealing element and the torque transmission element, which has dimensions in the radial direction that correspond at least to dimensions of a gap between the pre-sealing element and the wheel carrier and that are preferably larger. The region is located away from the sealing gap, in particular it extends in the axial direction from a location on the torque transmission element immediately adjacent to the sealing gap in the direction of the wheel hub.

The radial gap between the pre-sealing element and the torque transmission element is present in particular in the form of an annular gap, i.e. it is designed to be continuous and encircling in the circumferential direction. The dimensions of the radial gap in the radial direction are to be understood as minimum dimensions, i.e. the minimum dimensions of the radial gap in the radial direction over the entire region in the axial direction. The dimensions of the radial gap shall be at least as large as the dimensions of the gap between the pre-sealing element and the wheel carrier at the same location in the axial direction. The dimensions of the radial gap and the dimensions of the gap are therefore at the same axial position. Such a design prevents undesirable contact between the torque transmission element and the pre-sealing element during assembly of the wheel carrier arrangement.

A further development of the invention provides that the torque transmission element has an axial projection which engages in a central bore of the wheel hub, wherein the axial projection and the bore are designed such that they interact with one another in a form-fitting manner in the radial direction for positioning the torque transmission element with respect to the wheel hub before the pre-sealing element comes into contact with the torque transmission element. The axial projection is inserted into the central bore of the wheel hub during assembly of the wheel carrier arrangement until the gears engage with each other. For example, an internal thread is provided in the axial projection to accommodate the screw mentioned above.

The axial projection has an outer circumference which, during assembly, comes into contact with an inner circumference of the wheel hub that delimits the bore and thus aligns the torque transmission element in the radial direction with respect to the wheel hub. The axial projection is dimensioned in such a way that it already effects this alignment in the radial direction before the pre-sealing element comes into contact with the torque transmission element. This ensures that the pre-sealing element is elastically deflected evenly in the radial direction and is not compressed in the axial direction by the torque transmission element and thus potentially damaged. The described design of the wheel carrier arrangement makes assembly significantly easier.

A further development of the invention provides that the recess, in particular the wheel bearing receptacle, is designed with an insertion bevel on a side facing the wheel bearing in the axial direction and/or on a side facing away from the torque transmission element. The recess therefore widens and its dimensions in the radial direction increase, namely as a function of the distance from the torque transmission element. This simplifies the insertion of the wheel bearing into the wheel carrier.

A further development of the invention provides that the pre-sealing element together with the wheel carrier delimits a pre-sealing space into which a water drainage hole opens. The pre-sealing space is formed by the recess of the wheel carrier. It is limited in the axial direction on the one hand by the pre-sealing element and in the axial direction on the other hand by a wall of the wheel carrier. The wall of the wheel carrier is angled with respect to the wheel hub axis of rotation, in particular it is perpendicular to it.

Preferably, the wall is in overlap with the pre-sealing element, for example, viewed in longitudinal section, at least 10%, at least 20% or at least 25% of the pre-sealing element is located on the side of the wall facing away from the wheel bearing. This achieves a good sealing by means of the pre-sealing element, which engages between the wheel carrier and the torque transmission element away from the pre-sealing space. In the radially outward direction, the pre-sealing space is limited by the wheel carrier and in the radially inward direction by the pre-sealing element. The water drainage hole opens into the pre-sealing space, namely at a lowest geodetic point of the pre-sealing space. This allows water present in the pre-sealing space to flow reliably towards the outside environment.

A further development of the invention provides that the pre-sealing space projects beyond the pre-sealing element in the radial direction. Viewed in the radial direction, the pre-sealing element only partially delimits the pre-sealing space, since the pre-sealing space extends further outwards in the radial direction than the pre-sealing element. This ensures reliable drainage of the water, since water thrown off by the pre-sealing element is guided in the pre-sealing space to the water drainage hole.

A further development of the invention provides that a wall of the wheel carrier delimiting the pre-sealing space on its radially outer side has an edge. At the edge, two regions of the wall meet at an angle; there is therefore no curve or similar. The edge, in turn, ensures reliable drainage of thrown-off water. The edge forms or defines a collecting channel into which the water thrown outwards in a radial direction is forced by the centrifugal force acting on it. The two wall regions that meet at the edge delimit the collecting channel in such a way that the collecting channel encompasses the part of the pre-sealing space that is furthest outward in the radial direction. The edge serves to reliably hold the water in the collecting channel and drain it towards the drainage hole. For this purpose, the edge and the drainage channel defined by it overlap with the pre-sealing element, in particular with the second sealing part of the pre-sealing element, when viewed in the axial direction.

A further development of the invention provides that the pre-sealing element is angled with respect to an imaginary plane perpendicular to the wheel hub axis of rotation. The pre-sealing element has a center plane which, viewed in the axial direction, intersects the center of the pre-sealing element. This center plane is angled relative to the plane perpendicular to the wheel hub axis of rotation, i.e. it forms an angle with it that is greater than 0° and less than 180°. For example, the angle is at least 5° and at most 15°. By such a positioning of the pre-sealing element, the centrifugal effect on water is increased.

The invention further relates to a method for producing a wheel carrier arrangement for a motor vehicle, in particular a wheel carrier arrangement according to any one or more of the preceding claims, wherein the wheel carrier arrangement has a wheel carrier and a wheel bearing for rotatably supporting a wheel hub on the wheel carrier about a wheel hub axis of rotation, wherein the wheel hub has a first gear which is brought into engagement with a second gear of a torque transmission element, wherein a sealing which interacts sealingly with a pre-sealing element is arranged between an inner ring and an outer ring of the wheel bearing and the pre-sealing element is brought into form-fitting engagement with the torque transmission element in order to fix it in the axial direction with respect to the wheel hub axis of rotation relative to the wheel bearing. It is intended that the pre-sealing element surrounds the outer ring of the wheel bearing to form a sealing labyrinth.

The advantages of such a procedure or of such a design of the wheel carrier arrangement have already been discussed. Both the wheel carrier arrangement and the method for its production can be refined according to the embodiments within the scope of this description, to which reference will therefore be made.

The features and feature combinations described in the description, in particular the features and feature combinations described below in the description of the figures and/or shown in the figures may be used not only in the respective specified combination, but also in other combinations or alone, without departing from the scope of the invention. The invention should therefore also be considered to comprise embodiments that are explicitly not shown or explained in the description and/or the figures, but emerge from the explained embodiments or can be derived from them.

BRIEF DESCRIPTION OF THE DRAWINGS

In the following, the invention will be explained in greater detail with reference to the exemplary embodiments depicted in the drawings, without this restricting the invention. In particular.

DETAILED DESCRIPTION

Figure 1:
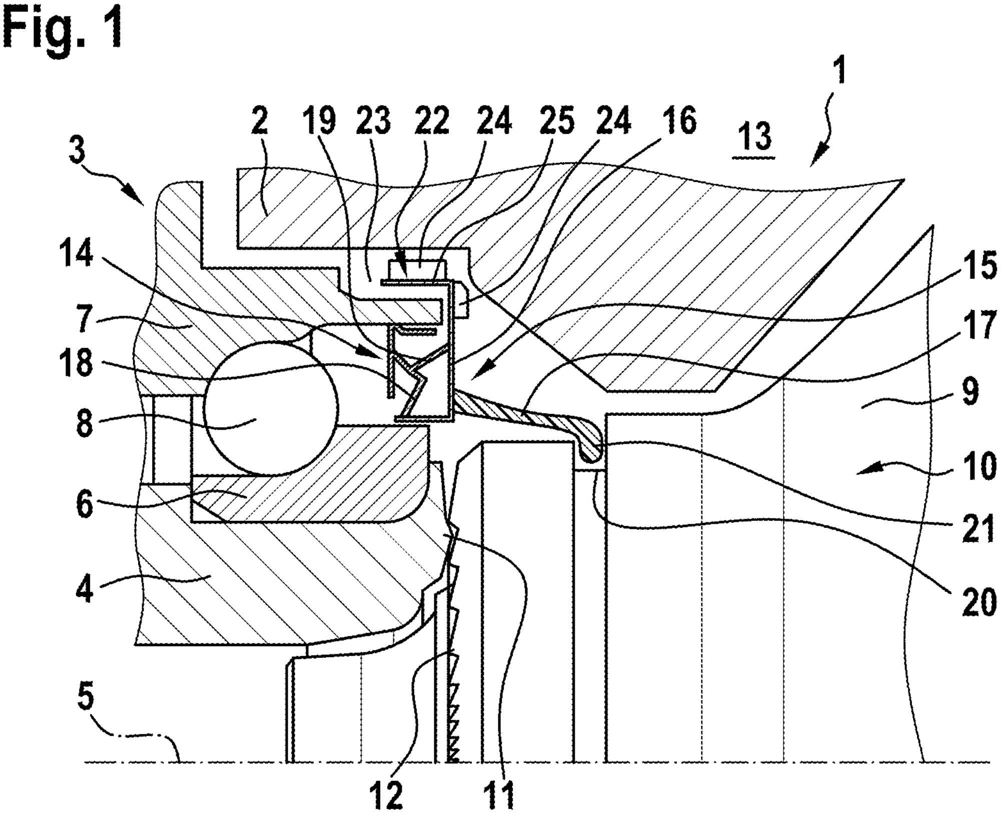
FIG. 1 is a schematic longitudinal sectional view of a wheel carrier arrangement in a first embodiment.

FIG. 1 shows a schematic longitudinal sectional view of a wheel carrier arrangement 1 in a first embodiment, as it is used in particular for a motor vehicle. The wheel carrier arrangement 1 has a wheel carrier 2, which is preferably connected to a body of the motor vehicle (not shown) via at least one control arm. By means of a wheel bearing 3, a wheel hub 4 is rotatably mounted with respect to the wheel carrier 2, namely about a wheel hub axis of rotation 5.

The wheel bearing 3 has an inner ring 6 and an outer ring 7, between which rolling elements 8 are arranged. It can be provided that the inner ring 6 is designed in one piece and from the same material as the wheel hub 4. In the present embodiment, it is designed separately. A torque transmission element 9 is arranged in the axial direction next to the wheel hub 4. Preferably, this is present as a joint element of an angularly movable joint 10. The wheel hub 4 has a first gear 11, which is present here as a spur gear, for example, and which is in torque-transmitting engagement with a second gear 12 of the torque transmission element 9, which is also designed as a spur gear.

To protect the wheel bearing 3, in particular its rolling elements 8, from influences from an external environment 13, the wheel carrier arrangement 1 has a sealing 14 which is arranged between the inner ring 6 and the outer ring 8, namely on a side of the rolling elements 8 facing the torque transmission element 9. In addition, a pre-sealing element 15 is provided which is arranged on the inner ring 6 and extends from it in the radial direction outwards. The pre-sealing element 15 has in particular a first sealing part 16 and a second sealing part 17. The first sealing part 16 rests against the inner ring 6 and extends outwards in the radial direction; the second sealing part 17 originates from the first sealing part 16 and extends away from the wheel bearing 3 in the axial direction. In the first embodiment shown, the two sealing parts 16 and 17 are made of different materials. For example, the first sealing part 16 is made of metal and the second sealing part 17 is made of plastic, which is molded onto the metal.

The sealing 14 is fastened to the outer ring 7 and rests against the pre-sealing element 15, more precisely against the first sealing part 16. Preferably, the sealing 14 has a plurality of sealing lips 18 and 19, wherein the sealing lip 18 rests sealingly against the pre-sealing element in the radial direction inwards and the sealing lip 19 rests sealingly against the pre-sealing element 15 in the axial direction. The pre-sealing element 15 overlaps the gear 11 and 12 in the axial direction and engages in a sealing gap 20 in a form-fitting manner, namely on its end 21 facing away from the wheel bearing 3. The sealing gap 20 is arranged on the side of the gear 11 and 12 in the torque transmission element 9 facing away from the wheel bearing 3. The engagement of the pre-sealing element 15 in the sealing gap 20 takes place in particular in such a way that a sealing effect is achieved. By engaging, on the one hand, the torque transmission element 9 is held in the axial direction with respect to the wheel hub 4 and, on the other hand, the gears 11 and 12 are protected from influences from the external environment 13.

In order to achieve a particularly reliable sealing of the wheel carrier arrangement 1, the pre-sealing element 15 is designed such that it surrounds the outer ring 7 of the wheel bearing 3, namely such that a sealing labyrinth 22 is created. For this purpose, the pre-sealing element 15 engages in a labyrinth gap 23 which is present between the outer ring 7 and the wheel carrier 2, more precisely is delimited in the radially inward direction by the outer ring 7 and in the radially outward direction by the wheel carrier 2. In the embodiment shown here, the labyrinth gap 23 is formed by a recess made in the outer ring 7.

It is also shown that the pre-sealing element 15 carries an encoder or pulse generator 24, which is used, for example, to measure the speed. The pulse generator 24 has a fastening material which is different from a material of the pre-sealing element 15, for example rubber is used as the fastening material, which is in particular vulcanized onto the pre-sealing element 15. By means of this fastening material, pulse generator elements are attached to the pre-sealing element 15. The pulse generator elements are, for example, embedded in the fastening material and distributed in the circumferential direction, in particular evenly distributed. They are preferably made of a magnetic or magnetizable material.

It can be provided that the pulse generator 24 is also arranged in the labyrinth gap 23. Alternatively, it is located outside thereof. Both variants are shown; however, usually only one of the two pulse generators 24 shown is present. For example, the pulse generator 24 is arranged on a sealing projection 25 of the pre-sealing element 15, which extends into the labyrinth gap 23.

Figure 2:
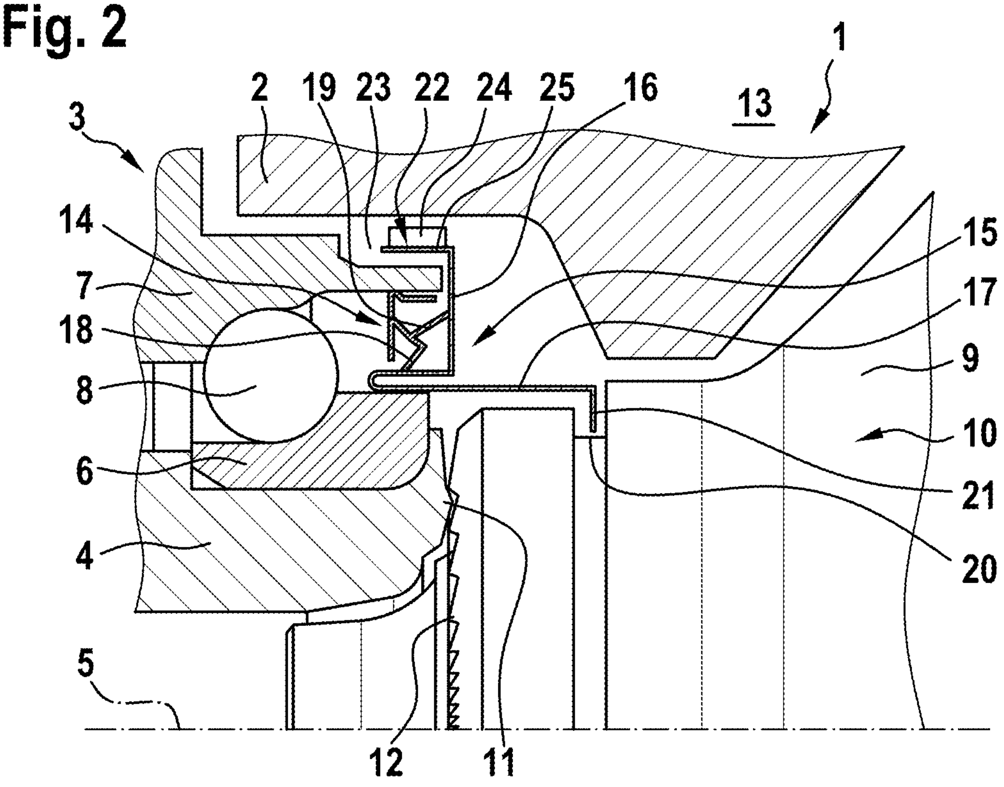
FIG. 2 is a schematic representation of the wheel carrier arrangement in a second embodiment.

FIG. 2 shows a schematic longitudinal sectional representation of the wheel carrier arrangement 1 in a second embodiment. This embodiment essentially corresponds to the first embodiment, so that reference is made to the entirety of the previous corresponding statements and only the differences are pointed out below. These consist in that the two sealing parts 16 and 17 are designed as one piece and made of the same material. The pre-sealing element 15 is, for example, available as a bent sheet metal part.

Figure 3:
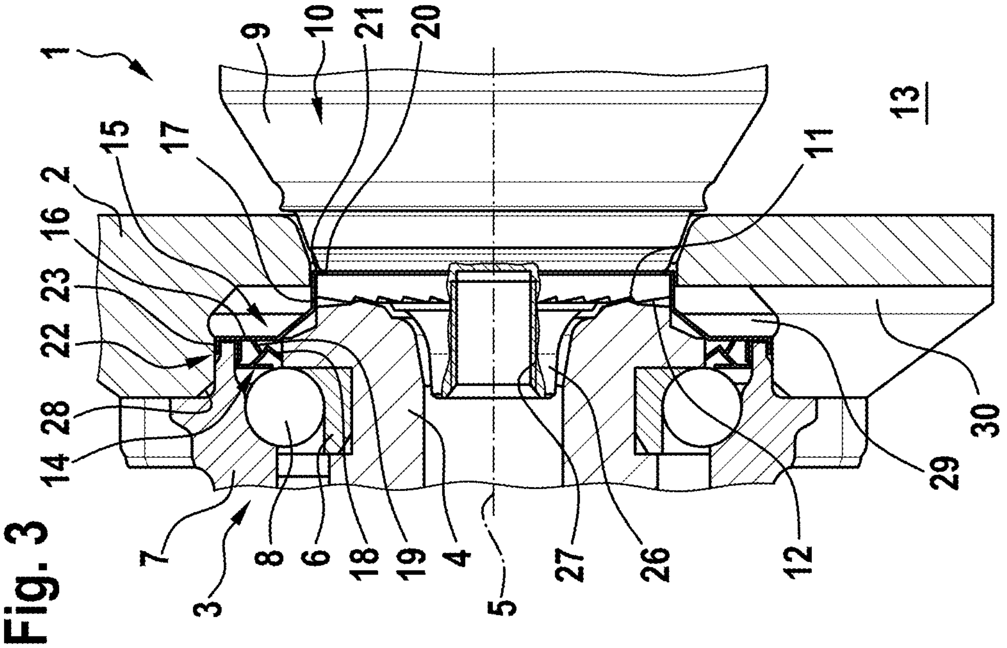
FIG. 3 is a schematic representation of the wheel carrier arrangement in a first view.

FIG. 3 shows a further schematic representation of the wheel carrier arrangement 1 in a first view. It can now be seen that the torque transmission element 9 has an axial projection 26. For example, an internal thread 27 is formed therein, into which a screw for clamping the torque transmission element 9 and the wheel hub 4 against each other can be screwed. It can also be seen that the wheel carrier 2 has an insertion bevel 28 on its side facing the wheel bearing 3 in the axial direction in order to simplify pressing the wheel bearing 3 into the wheel carrier 2. It can also be seen that the pre-sealing element 15 together with the wheel carrier 2 delimits a pre-sealing space 29. A water drainage hole 30 opens into this on a geodetic lower side.

Figure 4:
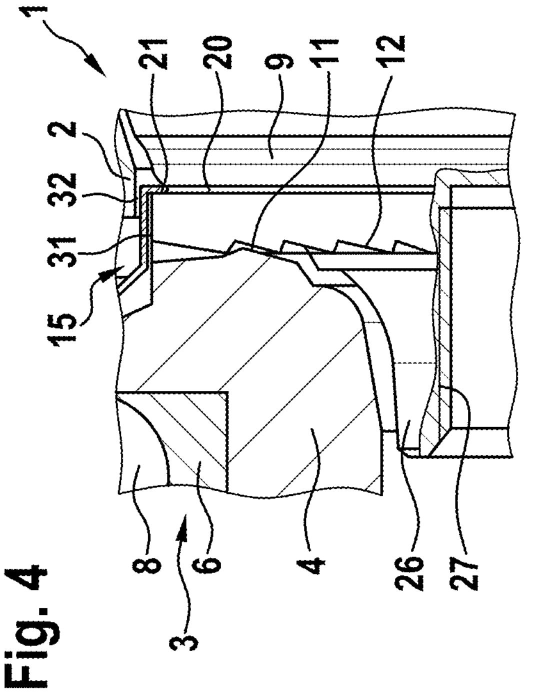
FIG. 4 is a schematic representation of the wheel carrier arrangement in a second view.

FIG. 4 shows a further schematic detailed representation of the wheel carrier arrangement 1 in a second view. It can be seen in particular that there is a radial gap 31 between the pre-sealing element 15 and the torque transmission element 9, which gap has at least the same dimensions as a gap 32 which exists between the pre-sealing element 9 and the wheel carrier 2.

Figure 5:
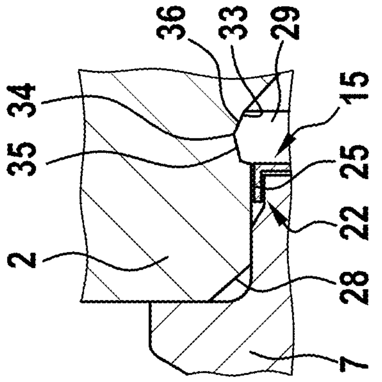
FIG. 5 is a schematic representation of the wheel carrier arrangement in a third view.

FIG. 5 shows a further schematic detailed representation of the wheel carrier arrangement 1, namely in the region of the sealing labyrinth 22. The pre-sealing space 29 delimited by the pre-sealing element 15 is delimited in the radial outward direction by a wall 33 which is formed by the wheel carrier 2. This wall has an edge 34 in which two partial walls 35 and 36 meet at an angle which is greater than 0° and less than 180°. For example, the angle is an obtuse angle, but it can also be an acute angle. With the help of the edge 34, liquid is reliably drained towards the water drainage hole 30 and a flow towards the wheel bearing is prevented.

LIST OF REFERENCE NUMERALS

1 wheel carrier arrangement
2 wheel carrier
3 wheel bearing
4 wheel hub
5 wheel hub axis of rotation
6 inner ring
7 outer ring
8 rolling element
9 torque transmission element
10 joint
11 1. gear
12 2. gear
13 outer environment
14 sealing

15 pre-sealing element
16 1. sealing part
17 2. sealing part
18 sealing lip
19 sealing lip
20 sealing gap
21 end
22 sealing labyrinth
23 labyrinth gap
24 pulse generator
25 sealing projection
26 axial projection
27 internal thread
28 insertion bevel
29 pre-sealing space
30 water drainage hole
31 radial gap
32 gap
33 wall
34 edge
35 partial wall
36 partial wall

The invention claimed is:

1. A wheel carrier arrangement for a motor vehicle, comprising:

a wheel carrier;

a wheel bearing configured to mount a wheel hub on the wheel carrier about a wheel hub axis of rotation, wherein the wheel hub has a first gear which is configured to engage with a second gear of a torque transmission element;

a sealing configured to interact with a pre-sealing element, wherein the sealing is arranged between an inner ring of the wheel bearing and an outer ring of the wheel bearing, and the pre-sealing element is configured to form-fittingly engage with the torque transmission element in order to fix the torque transmission element in the axial direction with respect to the wheel hub axis of rotation relative to the wheel bearing, and the pre-sealing element surrounds the outer ring of the wheel bearing in a circumferential direction to form a sealing labyrinth and includes a sealing projection; and a labyrinth gap formed by a recess in the outer ring and configured to receive the pre-sealing element is delimited radially between the outer ring inwardly and the wheel carrier outwardly, wherein the recess is formed on a side of the outer ring facing the wheel carrier, and the sealing projection extends into the labyrinth gap, wherein a distance by which the sealing projection extends into the labyrinth gap in an axial direction is at least 1.5 times a gap width of the labyrinth gap, and wherein the sealing projection in the labyrinth gap has a first radial distance from the outer ring and a second radial distance from the wheel carrier, each of the first radial distance and the second radial distance being 0.1 mm to 5 mm.

2. The wheel carrier arrangement according to claim 1, wherein the torque transmission element is a joint element of an angularly movable joint.

3. The wheel carrier arrangement according to claim 2, wherein the pre- sealing element has a first sealing part and a second sealing part, wherein the first sealing part rests on the inner ring of the wheel bearing and extends to the side of the outer ring facing away from the inner ring and the second sealing part extends from the first sealing part and interacts with the torque transmission element in a form-fitting manner.

4. The wheel carrier arrangement according to claim 2, wherein the pre-sealing element has a first sealing part and a second sealing part, wherein the first sealing part consists of a first material and the second sealing part consists of a second material, wherein the first material and the second material are identical or different from one another.

5. The wheel carrier arrangement according to claim 2, wherein the pre-sealing element has a first sealing part and a second sealing part, wherein the first sealing part is materially connected to the second sealing part, or the first sealing part and the second sealing part are designed in one piece and from the same material.

6. The wheel carrier arrangement according to claim 2, wherein the pre-sealing element has a first sealing part and a second sealing part, wherein the second sealing part is elastic, so that an end of the second sealing part facing the torque transmission element can be elastically deflected relative to the first sealing part.

7. The wheel carrier arrangement according to claim 1, wherein the pre-sealing element has a first sealing part and a second sealing part, wherein the first sealing part rests on the inner ring of the wheel bearing and extends to the side of the outer ring facing away from the inner ring and the second sealing part extends from the first sealing part and interacts with the torque transmission element in a form-fitting manner.

8. The wheel carrier arrangement according to claim 7, wherein the first sealing part consists of a first material and the second sealing part consists of a second material, wherein the first material and the second material are identical or different from one another.

9. The wheel carrier arrangement according to claim 7, wherein the first sealing part is materially connected to the second sealing part, or the first sealing part and the second sealing part are designed in one piece and from the same material.

10. The wheel carrier arrangement according to claim 7, wherein the second sealing part is elastic, so that an end of the second sealing part facing the torque transmission element can be elastically deflected relative to the first sealing part.

11. The wheel carrier arrangement according to claim 1, wherein the pre-sealing element has a first sealing part and a second sealing part, wherein the first sealing part consists of a first material and the second sealing part consists of a second material, wherein the first material and the second material are identical or different from one another.

12. The wheel carrier arrangement according to claim 11, wherein the first sealing part is materially connected to the second sealing part, or the first sealing part and the second sealing part are designed in one piece and from the same material.

13. The wheel carrier arrangement according to claim 1, wherein the pre-sealing element has a first sealing part and a second sealing part, wherein the first sealing part is materially connected to the second sealing part, or the first sealing part and the second sealing part are designed in one piece and from the same material.

14. The wheel carrier arrangement according to claim 1, wherein the pre-sealing element has a first sealing part and a second sealing part, wherein the second sealing part is elastic, so that an end of the second sealing part facing the torque transmission element can be elastically deflected relative to the first sealing part.

15. The wheel carrier arrangement according to claim 1, wherein the wheel carrier has a wheel-carrier recess in which the wheel bearing, the wheel hub and the torque transmission element are each arranged at least in regions and in that internal dimensions of the wheel-carrier recess in the radial direction with respect to the wheel hub axis of rotation decrease from the wheel bearing in the direction of the torque transmission element.

16. The wheel carrier arrangement according to claim 15, wherein the wheel-carrier recess is designed with an insertion bevel on a side facing the wheel bearing in the axial direction and/or on a side facing away from the torque transmission element.

17. The wheel carrier arrangement according to claim 1, wherein for form-fitting interaction of the pre-sealing element with the torque transmission element, the torque transmission element has a sealing gap in which the pre-sealing element engages in a sealing manner.

18. The wheel carrier arrangement according to claim 1, wherein the pre-sealing element together with the wheel carrier delimits a pre-sealing space into which a water drainage bore opens.

19. A wheel carrier arrangement for a motor vehicle, comprising:

a wheel carrier;

a wheel bearing configured to mount a wheel hub on the wheel carrier about a wheel hub axis of rotation, wherein the wheel hub has a first gear which is configured to engage a second gear of a torque transmission element;

a sealing configured to interact with a pre-sealing element, wherein the sealing is arranged between an inner ring of the wheel bearing and an outer ring of the wheel bearing, and the pre-sealing element is configured to form-fittingly engage with the torque transmission element in order to fix the torque transmission element in the axial direction with respect to the wheel hub axis of rotation relative to the wheel bearing, and the pre-sealing element is arranged to surround the outer ring of the wheel bearing in a circumferential direction in order to form a sealing labyrinth and includes a sealing projection;

a labyrinth gap formed by a recess in the outer ring and configured to receive the pre-sealing element is delimited radially between the outer ring inwardly and the wheel carrier outwardly, wherein the recess is formed on a side of the outer ring facing the wheel carrier, and the sealing projection extends into the labyrinth gap; and a pulse generator is embedded in a fastening material and attached to the pre-sealing element, wherein the fastening material is different from a material of the pre-sealing element, and wherein the pulse generator is arranged on the sealing projection in the labyrinth gap.

* * * * *